United States Patent
Lang et al.

(10) Patent No.: US 10,392,516 B2
(45) Date of Patent: Aug. 27, 2019

(54) FIRE PROTECTION COMPOSITION AND USE THEREOF

(71) Applicant: Hilti Aktiengesellschaft, Schaan (LI)

(72) Inventors: Martin Lang, Planegg (DE); Sebastian Simon, Buchloe Lindenberg (DE); Juliane Marauska, Reutlingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/319,003

(22) PCT Filed: Jun. 17, 2015

(86) PCT No.: PCT/EP2015/063539
§ 371 (c)(1),
(2) Date: Dec. 15, 2016

(87) PCT Pub. No.: WO2015/193343
PCT Pub. Date: Dec. 23, 2015

(65) Prior Publication Data
US 2017/0130068 A1 May 11, 2017

(30) Foreign Application Priority Data
Jun. 18, 2014 (EP) ..................... 14172918

(51) Int. Cl.
| | |
|---|---|
| *C09D 5/18* | (2006.01) |
| *C08G 59/50* | (2006.01) |
| *C08G 59/66* | (2006.01) |
| *C08L 63/00* | (2006.01) |
| *C08L 81/04* | (2006.01) |
| *C08K 3/016* | (2018.01) |
| *C09D 7/65* | (2018.01) |
| *C08K 3/10* | (2018.01) |
| *E04B 1/94* | (2006.01) |

(52) U.S. Cl.
CPC ............. *C09D 5/185* (2013.01); *C08G 59/50* (2013.01); *C08G 59/66* (2013.01); *C08K 3/016* (2018.01); *C08L 63/00* (2013.01); *C08L 81/04* (2013.01); *C09D 7/65* (2018.01); *E04B 1/94* (2013.01); *C08K 3/10* (2013.01)

(58) Field of Classification Search
CPC ...... C08L 59/66; C08L 59/50; C08L 59/5006; C08G 59/66; C08G 59/50; C08G 59/5006
See application file for complete search history.

(56) References Cited

U.S. PATENT DOCUMENTS

| | | | |
|---|---|---|---|
| 4,529,467 A * | 7/1985 | Ward ..................... | C09D 5/185 106/18.13 |
| 4,656,095 A | 4/1987 | McAllister et al. | |
| 5,214,098 A * | 5/1993 | Setiabudi ............... | C08G 59/50 428/413 |
| 6,447,708 B1 | 9/2002 | Thepot et al. | |
| 10,000,659 B2 * | 6/2018 | Lang ...................... | C09D 5/185 |

FOREIGN PATENT DOCUMENTS

| | | | |
|---|---|---|---|
| CN | 101560357 A | * | 10/2009 |
| CN | 102040935 A | * | 5/2011 |
| DE | 35 19 581 A1 | | 12/1985 |
| DE | 196 49 749 A1 | | 6/1998 |
| JP | 2007002170 A | * | 1/2007 |
| JP | 2010248380 A | * | 11/2010 |
| WO | WO 99/51663 A1 | | 10/1999 |

OTHER PUBLICATIONS

Machine translated English language equivalent of JP 2010-248380 (Nov. 2010, 13 pages).*
Machine translated English language equivalent of JP 2007-002170 (Jan. 2007, 10 pages).*
Mitsubishi Chemical (jER 1001 Techinical Data Sheet, Mitsubishi Chemical, 2017, 1 page).*
Kolesnikova (Influence of the thermodynamic state of bisphenol A and aliphatic epoxy oligomers on the temperature dependences of Newtonian viscosity. Plasticheski Massy, 4, 2009, pp. 34-40 or pp. T/15-T/21).*
Hexion (Epikote Resin 1001 Solutions (Core) Technical Data Sheet. Hexion. 2017, 2 pages).*
Derwent Abstract of CN 101560357 (Acc. No. 2009-Q64379).*
Zheng (High strain epoxy shape memory polymer. Polym. Chem. 2015, 6, pp. 3046-3053).*
Machine Translated English language equivalent of CN 102040935 (2001, 3 pages).*
International Search Report (PCT/ISA/210) issued in PCT Application No. PCT/EP2015/063539 dated Aug. 17, 2015 with English translation (five pages).
German-language Written Opinion (PCT/ISA/237) issued in PCT Application No. PCT/EP2015/063539 dated Aug. 17, 2015 (five pages).

* cited by examiner

*Primary Examiner* — Brieann R Johnston
(74) *Attorney, Agent, or Firm* — Grüneberg and Myers PLLC

(57) ABSTRACT

The invention relates to a composition which contains a binder based on epoxy-thiol. Said claimed composition makes it possible to apply, in a simple and rapid manner, coatings that have the layer thickness required for the respective fire resistance grading, the layer thickness being reduced to a minimum while achieving a good fire protection effect. Said claimed composition is particularly suitable for fire protection, especially as a coating for cables and cable routes for increasing the fire resistance grading.

15 Claims, No Drawings

FIRE PROTECTION COMPOSITION AND USE THEREOF

The present invention relates to a composition, in particular an ablative composition which contains a binder based on epoxy-thiol as well as the use thereof for fire protection, in particular for the coating of components such as supports, beams, frame members, insulation systems, e.g. soft fittings, cables, cable bundles or cable routes for increasing the fire resistance grading.

In the case of fires, cable routes constitute particular points of danger for a number of reasons. On the one hand, in the case of fires of cables insulated with plastic, intensive smoke development occurs with the emission of harmful, in part toxic materials. On the other hand, a fire can quickly spread along cable routes and under certain circumstances the fire can be guided to a point that is far away from the original source of the fire. In the case of cable systems, there is also the problem that in the case of these cables the effect of the insulation decreases due to thermal impact or combustion and an interruption of the current flow can occur due to short-circuiting and thus the cables are destroyed or are not functional.

Electrical cables or lines are often laid in hallways and subdivided from there into the adjoining rooms. These hallways serve as escape and rescue routes in event of fire, which become unusable in the case of fires of cable installations due to smoke development and toxic fire gases, and e.g. burning PVC releases highly-corrosive gases. Large groups of cables thus constitute a significant risk potential, in particular in industrial construction, in power stations, in hospitals, large and administrative buildings and generally in buildings with high installation density. The cable insulations are often the relevant fire load in these buildings and cause fires lasting a long time with fire room temperatures in worst case scenarios up to over 1000° C. For the mentioned reasons, particular attention must be paid to cable routes with regard to fire protecting measures.

In order to prevent, at least for a period of time, the dangers of the lack of functionality of the cables and the strong fire load increase by the cables, it is known to spatially separate the cables by non-flammable construction materials of the building material class A1 or A2 by laying the cables e.g. in installation and/or functional maintenance channels. However, this requires significant labor input. In addition, there is a high space requirement due to complex constructions which, in addition to the weight of the cable routes, must take into consideration the weight of the installation and/or maintenance channels. To this end, cables and cable routes are often wrapped with insulating materials such as aluminum oxide silica mats or mineral wool mats. In order to achieve sufficient fire protection, the material must be very thick. However, this leads to problems with respect to the distances between the protected object and adjacent or overlaid objects. Furthermore, these materials cause problems during normal operation due to their thermal insulating properties. One of these problems is termed "reduction of the current carrying capacity". This means that the heat generated by electrical cables in the cable pipe or the cable route can no longer be dissipated in the region of the insulation, which leads to the secure current operating level permitted in these cables being reduced or overheating of the cables taking place. These disadvantages make this type of fire protection very inflexible with respect to the usage area thereof.

In order to avoid these disadvantages, it is also known to apply coatings for the protection of electrical cables which becomes intumescent with thermal impact in the event of fire, i.e. they foam and thus form an insulation layer or they receive heat due to physical and chemical processes and thus act in a cooling manner.

With intumescent coatings it is possible to prevent the involvement of cables in the event of fire for 30 minutes or longer. Coated cables of this type are often laid on cable routes. However, in this regard it has been shown that in the case of a vertical or inclined arrangement of the cable routes, a completely foamed insulation layer cannot prevent the spread of fire without additional measures. During heating, the cables between the cable clamps deforms so much that the coating forming the insulation layer tears and partially spalls. The resulting foam also comes loose from the cables and falls off. In the case of coating applied after laying the cables, the cables in the region of the clamp constructions are not fully accessible. As a result, in the case of a vertical or inclined arrangement of cable routes only a foam of low thickness develops in the event of fire in the region of the clamp constructions, which is no longer sufficient as fire proofing for 30 minutes. In the case of laying PVC cables, the known problems in the event of fire thus occur again.

It is also known to use non-halogen cables provided in a flame-retardant or flame-resistant manner and which are flame-resistant and produce little smoke and have poor fire transfer properties. However, these cables are very expensive and are thus used only under extremely hazardous conditions.

In order to avoid the disadvantages of intumescent coatings, materials are applied to the cables and cable holders in cable routes, said materials exhibit an ablation effect, i.e. acting in a cooling manner under the influence of heat and becoming ceramic, as described for example in DE 196 49 749 A1. A method is described herein for designing fire protection for flammable components or components that are a heat risk, and the components are provided with a coating which contains, as the binder, an inorganic material made of finely-ground hydraulic binders such as calcium silicate, calcium aluminate or calcium ferrite, to which is added ablative materials such as aluminum or magnesium hydroxide. What is a disadvantage with this measure is that, on the one hand, the application of the material exhibiting the ablation effect is time-consuming and, on the other hand, the adherence of the material to the cables and to the cable holders poses a problem.

Other coating systems currently available on the market, which do not have some of the above-mentioned disadvantages, are single-component coating compositions on the basis of polymer dispersions which contain endothermically decomposing compounds. What is disadvantageous with these coatings is, on the one hand, the relatively long drying time of the coating and associated low dry layer thickness since these systems dry physically, i.e. through the evaporation of the solvent. A plurality of successive applications is thus required for thicker coatings, which also makes these systems time-consuming and labor intensive and thus uneconomical.

The object therefore underlying the invention is to provide an ablative coating system of the type mentioned at the outset which avoids the mentioned disadvantages which is in particular not solvent or water-based and has rapid hardening, is easy to apply owing to correspondingly adapted viscosity and requires only low layer thickness owing to the achievable high degree of filling.

This object is achieved by the composition according to claim 1. Preferred embodiments can be inferred from the dependent claims.

The subject matter of the invention is therefore a fire protection composition having a component A, which contains at least one epoxy resin, having a component B, which contains at least one thio compound as the hardener and having a component C, which contains at least one ablative fire protection additive.

The composition can also contain a catalyst for the reaction between the epoxy resin and the thio compound, whereby the composition is workable in a sufficiently rapid manner and can be hardened at low temperatures, for example at room temperature.

Coatings with the layer thickness required for the respective fire resistance grading can be more easily and quickly applied by means of the composition according to the invention. The advantages achieved by means of the invention are substantially to be seen by the fact that in comparison to the systems on a solvent or water basis with their inherent long hardening times, the working time can be significantly reduced.

A further advantage is that the composition according to the invention can have a high degree of filling with the fire protection additive such that even with thin layers a strong insulating effect is achieved. The possible high degree of filling of the composition can be achieved even without the use of slightly volatile solvents. Accordingly, the material input reduces, which has a favorable effect on the material costs in particular in the case of an extensive application. This is achieved in particular by the use of a reactive system which does not dry physically, but rather hardens chemically via an addition reaction. The compositions thus do not suffer from any volume loss through the drying of solvents or of water in the case of water-based systems. A solvent content of approximately 25% is thus typical in the case of a classic system. This means that from a 10 mm wet film layer, only 7.5 mm remains on the substrate to be protected as the actual protective layer. In the case of the composition according to the invention, more than 95% of the coating remains on the substrate to be protected.

In the event of fire, the binder softens and the fire protection additives contained therein decompose depending on the additives used in an endothermic physical or chemical reaction with the development of water and inert gases, which, on the one hand, leads to the cooling of the substrate and, on the other hand, to the diluting of the flammable gases or through the formation of a protective layer which protects the substrate from heat and attack by oxygen and, on the other hand, prevents the spreading of the fire through the combustion of the coating.

The composition according to the invention exhibits excellent adherence to different substrates compared to solvent or water-based systems if these are applied without primer such that they can be used universally and adhere not only to lines to be protected, but also to other carrier materials.

In order to improve the understanding of the invention, the following explanations of the terminology used herein are considered useful. In the context of the invention:

"multi-functional" means that the corresponding compound has more than one functional group per molecule; accordingly multi-functional in the context of epoxide compounds means that said compounds have more than one epoxide group per molecule and with regard to thiol-functionalized compounds that they have at least two thiol groups per molecule; the total number of the respective functional groups is the functionality of the corresponding compound;

"skeleton" of the epoxide resin or the thiol-functionalized compound of the respectively other part of the molecule to which the functional epoxide or thiol group can be bonded;

"ablative" means that in the case of the impact of high temperatures, i.e. above 200° C., as can occur for example in the event of fire, a series of chemical and physical reactions takes place, which require energy in the form of heat, and this energy is removed from the environment; this term is used synonymously with the term "endothermically decomposing";

"oligomer" is a molecule with 2 to 5 repeat units and a "polymer" is a molecule with 6 or more repeat units and can have structures which are linear, branched, star-shaped, looped, hyperbranched or crosslinked; polymers can have a single type of repeat unit ("homopolymers") or they can have more than one type of repeat unit ("copolymers"). A "resin" is a synonym for polymer, as used herein.

"epoxide equivalent weight" means the quantity of epoxide resin in [g] which has an equivalent [val] epoxide function and is calculated from the mole mass M in [g/mol] divided by the functionality f in [val/mol]; (EEW [g/val].

It is generally accepted that the conversion of an epoxide resin with a functionality of two with a thio compound, in particular thiol-functionalized compound with a functionality of two will lead to linear molecular structures. Often, molecular structures have to be generated, which are branched and/or crosslinked, for which the use of at least one ingredient with a functionality greater than two is probably required. Thus the epoxide resin and/or the thio compound, in particular thiol-functionalized compound is preferably multi-functional, and the multi-functional epoxide resin or the multi-functional thiol compound, in particular multi-functional thiol-functionalized compound or both more preferably have a functionality greater than two (>2).

Conventional epoxide resins in epoxide chemistry are suitable as the epoxide resin. These are obtained in a known manner, for example from the oxidation of the corresponding olefins or from the reaction of epichlorohydrin with the corresponding polyols, polyphenols or amines. Basic information on and examples for epoxide resins can be inferred from the section "Epoxy resins" of the Encyclopedia of Polymer Sciences and Technology, Vol. 9, Wiley-Interscience, 2004. Reaction products of polyhydroxy compounds can be mentioned by way of example as suitable epoxide resins, in particular polyvalent phenols or phenol-aldehyde condensates with epihalohydrins or the precursors thereof, in particular:

a) reaction products of epichlorohydrin with bisphenol A;
b) reaction products of epichlorohydrin with bisphenol S;
c) epoxy novolacs on phenol or cresol basis;
d) aromatic glycidyl amine resins;
e) epoxide resins without aromatic structural units;

as well as mixtures of two or more epoxide resins of this type in any ratio and in any degrees of purity.

So-called polyepoxide liquid resins are particularly suitable as epoxide resin, they are termed "liquid resin" hereinafter. These have a glass transition temperature which is usually below 25° C., unlike so-called solid resins, which have a glass transition temperature above 25° C. and can be crushed to powders pourable at 25° C. Suitable compounds are the glycidylization products of:

dihydroxybenzene derivatives such as resorcinol, hydroquinone and pyrocatechol;

further bisphenols or polyphenols such as bis-(4-hydroxy-3-methylphenyl)-methane, 2,2-bis-(4-hydroxy-3-methylphenyl)-propane (bisphenol-C), bis-(3,5-dimethyl-4-hydroxyphenyl)-methane, 2,2-bis-(3,5-dimethyl-4-hydroxyphenyl)-propane, 2,2-bis-(4-hydroxyphenyl)-butane (bisphenol-B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol-Z), 1,1-bis-(4-hydroxyphenyl)-3,3,5-trimethylcyclohexane (bisphenol-Z), 1,1-bis-(4-hydroxyphenyl)-3,3,5-trimethylcyclohexane (bisphenol-TMC), 1,1-bis-(4-hydroxyphenyl)-1-phenyl-ethane, 1,4-bis[2-(4-hydroxyphenyl)-2-propyl]-benzol (bisphenol-P), 1,3-bis-[2-(4-hydroxyphenyl)-2-propyl]-benzol (bisphenol-M), 4,4'-dihydroxydiphenyl (DOD), 4,4'-dihydroxybenzophenon, bis-(2-hydroxynaphth-1-yl)-methane, bis-(4-hydroxynaphth-1-yl)-methane 1,5-dihydroxy-naphthalin, tris-(4-hydroxyphenyl)-methane, 1,1,2,2-tetrakis-(4-hydroxyphenyl)-ethane bis-(4-hydroxyphenyl)-ether, bis-(4-hydroxyphenyl)sulfate;

condensation products of phenols with formaldehyde which are obtained under acidic conditions, such as phenol novolacs or cresol novolacs, also called bisphenol F novolacs;

aromatic amines, such as aniline, toluidine, 4-aminophenol, 4,4'-methylendiphenyldiamine (MDA), 4,4'-methylendiphenyldi-(N-methyl)-amine, 4,4'[1,4-phenylene-bis-(1-methylethylidene)]-bisaniline (bisaniline-P), 4,4'[1,3-phenylene-bis-(1-methylethylidene)]-bisaniline (bisaniline-M);

as well as mixtures of two or more of epoxide resins of this type in any ratio and in any degrees of purity.

Further preferred in the context of the invention are reaction products of epichlorohydrin with bisphenol A with an epoxide equivalent weight (EEW)≤550 g/val; reaction products of epichlorohydrin with bisphenol F, the simplest representative of novolacs, with an EEW≤500 g/val; any mixtures of these two reaction products, reaction products of any mixture of bisphenol A and bisphenol F with epichlorohydrin, epoxide resins such as hydantoin-based epoxide resins or diglycidyl ethers of hydrogenated bisphenol A or bisphenol F; as well as mixtures of two or more of epoxide resins of this type in any ratio and in any degrees of purity.

Particularly preferred are reaction products of epichlorohydrin with bisphenol A with an EEW≤330 g/val; reaction products of epichlorohydrin with bisphenol F, the simplest representative of novolacs, with an EEW≤300 g/val; any mixtures of these two reaction products, reaction products of any mixture of bisphenol A and bisphenol F with epichlorohydrin with an EEW≤330 g/val, 5,5-dimethyl-1,3-bis(2,3-epoxypropyl)-2,4-imidazolidinedione; 2,2-bis[4-(2,3-epoxypropoxy)-cyclohexyl]propane; as well as mixtures of two or more of epoxide resins of this type in any ratio and in any degrees of purity.

Quite particularly preferred are reaction products of epichlorohydrin with bisphenol A with an EEW≤200 g/val; such as for example Epilox® A 17-01, Epilox® A 18-00, Epilox® A 19-00, Epilox® A 19-02, Epilox® A 19-03 or Epilox® A 19-04 from Leuna-Harze GmbH, represented by the following formula, where 0≤n≤0.2;

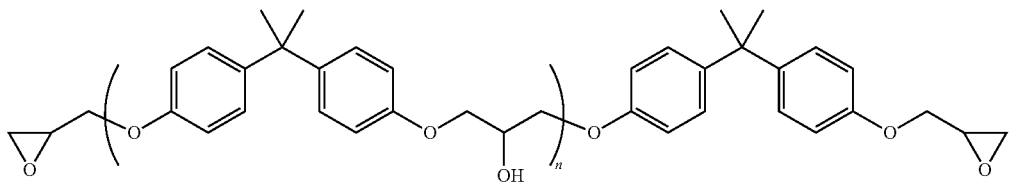

Reaction products of epichlorohydrin with bisphenol F, the simplest representative of novolacs, with an EEW≤185 g/val, such as for example Epilox® F 16-01 or Epilox® F 17-00 from Leuna-Harze GmbH, represented by the following formula, where 0≤n≤0.2;

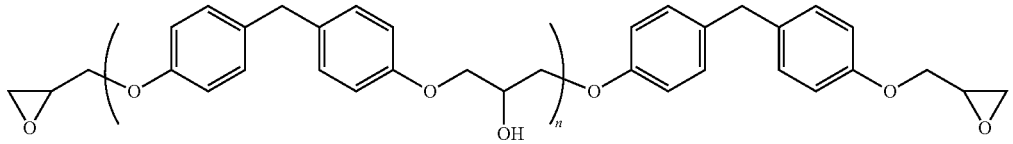

as well as mixtures of two or more of epoxide resins of this type in any ratio and in any degrees of purity, such as for example Epilox® AF 18-30, Epilox® 18-50 or Epilox® T 19-27 from Leuna-Harze GmbH as well as reaction products of any mixture of bisphenol A and bisphenol F with epichlorohydrin with an EEW≤200 g/val.

As epoxide resin, an aliphatic or cycloaliphatic polyepoxide is also suitable, such as for example:
 a glycidyl ether of a saturated or unsaturated, branched or unbranched, cyclic or open-chained $C_2$-$C_{30}$-diols, such as for example ethylene glycol, propylene glycol, butylene glycol, hexanediol, octanediol, a polypropylene glycol, dimethylolcyclohexane, neopentyl glycol or dibromoneopentyl glycol;
 a glycidylether of a tri- or tetrafunctional, saturated or unsaturated, branched or unbranched, cyclic or open-chained polyols such as castor oil, trimethylolpropane, trimethylolethane, pentaerythritol, sorbitol or glycerin, as well as alcoxylated glycerin or alcoxylated trimethylolpropane;
 a hydrogenated bisphenol A, F or A-F liquid resin, or the glycidylization products of hydrogenated bisphenol A, F or A-F;

an N-glycidyl derivative of amides or heterocyclic nitrogen bases, such as triglycidyl cyanurate and triglycidyl isocyanurate as well as conversion products of epichlorohydrin and hydantoin.

As epoxide resin, a bisphenol A, F or A-F solid resin are also possible which is structured similar to the already mentioned liquid resins of the above two formula, but instead of the index n has a value of 2 to 12 and a glass transition temperature above 25° C.

As epoxide resin, epoxide resins from the oxidation of olefins are lastly also suitable, for example from the oxidation of vinyl cyclohexenes, dicyclopentadienes, cyclohexadienes, cyclododecadienes, cyclododecatrienes, isoprenes, 1,5-hexadienes, budadienes, polybutadienes or divinylbenzene.

The degree of crosslinking of the binder and thus, on the one hand, the strength of the resulting coating as well as the elastic properties thereof can be set depending on the functionality of the epoxide resin.

By adding at least one reactive diluent, the viscosity of the composition can be set or adapted correspondingly to the application properties.

In an embodiment of the invention, the composition thus contains further epoxide group-containing compounds as reactive diluents, if required. These compounds contain one or more epoxide groups. Essentially, any low-viscous compound, which carries at least one epoxide group per molecule, can be used. Two or more different reactive diluents can be combined. Suitable examples are allyl glycidyl ether, butyl glycidyl ether (BGE), 2-ethylhexyl glycidyl ether, alkyl glycidyl ether ($C_{12}$-$C_{14}$), tridecyl glycidyl ether, phenyl glycidyl ether (PGE), o-cresol glycidyl ether (CGE), p-tert-butyl glycidyl ether, resorcinol diglycidyl ether (RDGE), 1,4-butanediol diglycidyl ether (BDGE), 1,6-hexanediol diglycidyl ether (HDGE), cyclohexanedimethanol diglycidyl ether, neopentyl glycol diglycidyl ether, trimethylolpropane triglycidyl ether, glycerol triglycidyl ether, polypropylene glycol diglycidyl ether as well as epoxidized vegetable oils such as for example epoxidized linseed oil and epoxidized castor oil.

Expediently, any thio compound, which can react with epoxide compounds, can be used as the hardener. In this regard, they are preferably thiol-functionalized compounds, and the thiol group (—SH) forms the functional group.

Expediently, any compound, which has at least two thiol groups, can be used as the thiol-functionalized compound. Each thiol group is in this regard bonded either directly or via a linker to a skeleton.

The thiol-functionalized compound of the present invention can have any wide number of skeletons, and these can be identical or different.

According to the invention, the skeleton is a monomer, an oligomer or a polymer.

In some embodiments of the present invention, the skeletons have monomers, oligomers or polymers with a molecular weight (mw) of 50,000 g/mol or less, preferably 25,000 g/mol or less, more preferably 10,000 g/mol or less, even more preferably 5,000 g/mol or less, even more preferably 2,000 g/mol or less and most preferably 1,000 g/mol or less.

As monomers which are suitable as skeletons, alkanediols, alkylene glycols, sugars, polyvalent derivatives thereof or mixtures thereof and amines, such as ethylene diamines and hexamethylene diamines and thiols can be mentioned by way of example. As oligomers or polymers which are suitable as skeletons, the following can be mentioned by way of example: polyalkylene oxide, polyurethane, polyethylene vinyl acetate, polyvinyl alcohol, polydiene, hydrogenated polydiene, alkyd, alkyd polyester, (meth)acrylic polymer, polyolefin, polyester, halogenated polyolefin, halogenated polyester, polymercaptan, as well as copolymers or the mixtures thereof.

In preferred embodiments of the invention, the skeleton is a polyvalent alcohol or a polyvalent amine, and these can be monomer, oligomer or polymer in nature. More preferably, the skeleton is a polyvalent alcohol.

As polyvalent alcohols which are suitable as skeletons, the following can be mentioned by way of example: alkanediols, such as butanediol, pentanediol, hexanediol, alkylene glycol, such as ethylene glycol, propylene glycol and polypropylene glycol, glycerin, 2-(hydroxymethyl)propane-1,3-diol, 1,1,1-tris(hydroxymethyl)ethane, 1,1,1-trimethylolpropane, di(trimethylolpropane), tricyclodecane dimethylol, 2,2,4-trimethyl-1,3-pentanediol, bisphenol A, cyclohexane dimethanol, alkoxylated and/or ethoxylated and/or propoxylated derivatives of neopentyl glycol, tertraethylene glycol cyclohexane dimethanol, hexanediol, 2-(hydroxylmethyl)propane-1,3-diol, 1,1,1-tris(hydroxymethyl)ethane, 1,1,1-trimethylolpropane and castor oil, pentaerythritol, sugars, polyvalent derivatives thereof or mixtures thereof.

As linkers, any units, which are suitable, can be used to connect skeleton and functional group. For thiol-functionalized compounds, the linker is preferably selected from the structures (I) to (XI).

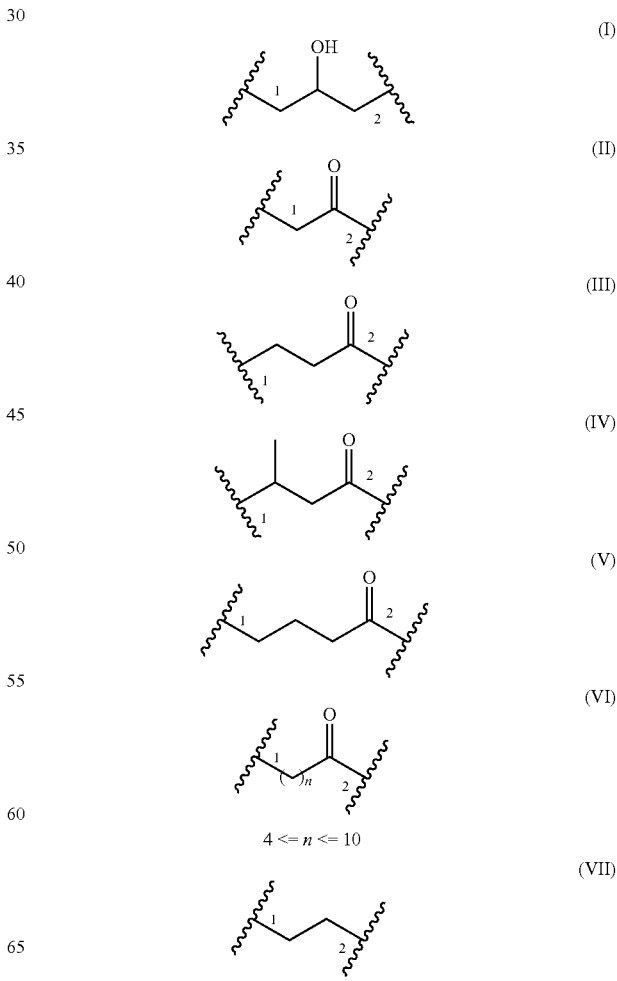

-continued

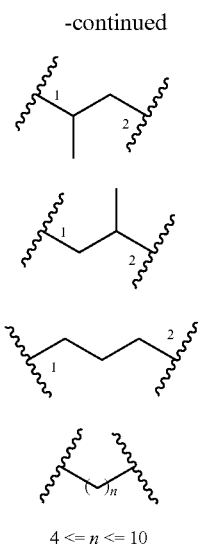

(VIII)

(IX)

(X)

(XI)

$4 \leq n \leq 10$

1: Bond to functional group
2: Bond to skeleton

As linkers for thiol-functionalized compounds, the structures (I), (II), (III) and (IV) are preferred.

Particularly preferred thiol-functionalized compounds are esters of the α-thioacetic acid (2-mercaptoacetate), β-thiopropionic acid (3-mercaptopropionate) and 3-thio butyric acid (3-mercaptobutyrate) with monoalcohols, diols, triols, tetraols, pentaols or other polyols as well as 2-hydroxy-3-mercaptopropyl derivatives of monoalcohols, diols, triols, tetraols, pentaols or other polyols. Mixtures of alcohols can also be used here as the basis for the thiol-functionalized compound. Reference is made in this respect to WO 99/51663 A1, the content of which is hereby included in this application.

As particularly suitable thiol-functionalized compounds, the following can be mentioned by way of example: glycol-bis(2-mercaptoacetate), glycol-bis(3-mercaptopropionate), 1,2-propyleneglycol-bis(2-mercaptoacetate), 1,2-propyleneglycol-bis(3-mercaptopropionate), 1,3-propyleneglycol-bis(2-mercaptoacetate), 1,3-propyleneglycol-bis(3-mercaptopropionate), tris(hydroxymethyl)methane-tris(2-mercaptoacetate), tris(hydroxymethyl)methane-tris(3-mercaptopropionate), 1,1,1-tris(hydroxymethyl)ethane-tris (2-mercaptoacetate), 1,1,1-tris(hydroxymethyl)ethane-tris (3-mercaptopropionate), 1,1,1-trimethylolpropane-tris(2-mercaptoacetate), ethoxylated 1,1,1-trimethylolpropane-tris (2-mercaptoacetate), propoxylated 1,1,1-trimethylolpropane-tris(2-m ercaptoacetate), 1,1,1-trimethylol propane-tri(3-m ercaptopropionate), ethoxylated 1,1,1-trimethylolpropane-tris(3-mercaptopropionate), propoxylated trimethylolpropane-tris(3-mercaptopropionate), 1,1,1-trimethylolpropane-tris(3-mercaptobutyrate), pentaerythritol-tris(2-m ercaptoacetate), pentaerythritol-tetrakis(2-mercaptoacetate), pentaerythritol-tris(3-mercaptopropionate), pentaerythritol-tetrakis(3-mercaptopropionate), pentaerythritol-tris(3-mercaptobutyrate), pentaerythritol-tetrakis(3-mercaptopropionate), pentaerythritol-tris(3-mercaptobutyrate), pentaerythritol-tetrakis(3-m ercaptobutyrate), Capcure 3-800 (BASF), GPM-800 (Gabriel Performance Products), Capcure LOF (BASF), GPM-800LO (Gabriel Performance Products), KarenzMT PE-1 (Showa Denko), 2-ethylhexyl thioglycolate, iso-octyl thioglycolate, di(n-butyl)thiodiglycolate, glycol-di-3-mercaptopropionate, 1,6-hexanedithiol, ethyleneglycol-bis(2-mercaptoacetate) and tetra(ethyleneglycol)dithiol.

The thiol-functionalized compound can be used alone or as a mixture of two or more different thiol-functionalized compounds.

The degree of crosslinking of the binder and thus, on the one hand, the strength of the resulting coating and the elastic properties thereof can be set depending on the functionality of the thiol-functionalized compound.

In the context of the present invention, the relative proportion of epoxide resins to thiol-functionalized compounds can be characterized by the reactive equivalent ratio which is the ratio of the number of all epoxide groups in the composition to the number of thiol groups in the composition. The reactive equivalent ratio is 0.1 to 10:1, preferably 0.2 to 5:1, more preferably 0.3 to 3:1, even more preferably 0.5 to 2:1 and even more preferably 0.75 to 1.25:1.

An amine hardener that is common for epoxide resins can optionally be used as an additional hardener constituent, also as co-hardeners. Suitable examples can be inferred from the section "Epoxy resins" of the Encyclopedia of Polymer Sciences and Technology, Vol. 9, Wiley-Interscience, 2004. Aliphatic or aromatic amines, amidoamines, polyamides, polyamine epoxide resin adducts and/or ketimines have in particular proven effective. The amine hardeners can be used alone or as a mixture of two or more compounds. Examples are ethylene diamine, propylene diamine, hexamethylene diamine, diethylenetriamine (DETA), tetraethylenetetramine (TETA), isophorone diamine (IPDA), m-xylylene diamine (mXDA), n-methylbenzylamine (NMB) or the Ancamide® (Air Products), diethylaminopropylamine (DEAPA), n-aminoethylpiperazine (N-AEP), diamino diphenyl sulfone (DDS), 1,8-diamino-p-methane (MDA). Similarly, polyether amines such as Jeffamine® D-230 (Huntsman), Jeffamine® D-400 (Huntsman), Jeffamine® T-403 (Huntsman) can be used.

The coating properties can be set via a correspondingly selected mixture of thio compound, in particular thiol-functionalized compound and amines as hardeners for the epoxide resin.

A catalyst for the hardening, i.e. the reaction of the epoxide resin with the thio compound, in particular thiol-functionalized compound can preferably be used. Compositions are obtained by means of using a catalyst, said compositions harden rapidly, i.e. within a few minutes and fully, even at room temperature which makes such compositions very attractive for on-site application, for example at the construction site.

The compounds commonly used for reactions between epoxide resins and thiol-functionalized compounds can be used as catalysts, such as for example tertiary amines, aminophenols, phenols, phosphines and phosphonium salts.

In a preferred embodiment of the invention, the catalyst is selected from 2,4,6-tris(dimethlaminomethyl)phenol, bis(dimethylaminomethyl)phenol, Ancamine® K-54 (AirProducts, Belgium), benzyldimethylamine, n,n-dimethylpropylamine, bis(dimethylaminoethyl)ether, bis-n, n-dimethylethanolaminether, 1,3-bis[3-(dimethylamino) propyl]urea, 1,1,3,3-tetramethylguanidine (TMG), 1,4-diazabicyclooctane (DABCO), 2-(2-(2-dimethylaminoethoxy)-ethylmethylamino)-ethanol, 1,8-diazabicyclo[5.4.0]undec-7-en (DBU), 1,5-diazabicyclo[4.3.0]non-5-en (DBN), N, N, N',N'', N''-pentamethyldiethylentriamine, nonylphenol, 2-ethyl-4-methylimidazole, dimethylaminopyridine, 2,6-dimethylpyridine, N,N-bis-(2-hydroxyethyl)-3-methylaniline, dimethylphenylphosphine, methyldiphenylphosphine, trioctylphosphine, triphenylphosphine, triphenylphosphite, tributyl hexadecyl phosphonium bromide. In this regard, reference is made to WO 2012/08224 A1, the content of which is hereby included in this application. The catalyst can optionally be present already dissolved in thiol (e.g. GPM-888, GPM-891).

The mode of action of the ablative composition according to the invention builds on an endothermic physical and/or chemical reaction, and materials, which require large quantities of energy for the decomposition thereof, are contained in the composition. If the hardened composition is exposed to high temperature, for example the temperature of a fire in the event of fire, a series of chemical and physical processes is initiated. These processes are for example the release of water vapor, change of the chemical composition and the development of inflammable gases, which maintain the oxygen required for combustion distanced from the cable surface. All these processes require a large quantity of energy, which is removed from the fire. After the conversion of all organic constituents has concluded, a stable insulation layer made of inorganic constituents is formed which has an additional insulation effect.

According to the invention, the constituent C thus contains at least one ablative fire protection additive, and both individual compounds and a mixture of a plurality of compounds can be used as the additive.

Expediently, such materials are used as ablative fire protection additives which form energy-absorbing layers by means of water separation, which is stored for example in the form of crystalline water, and water evaporation. The heat energy, which has to be expended in order to separate the water, is removed from the fire in this regard. Such materials are also used which chemically change or decompose, evaporate, sublime or melt in an endothermic reaction in the case of the influence of heat. As a result, the coated substrates are cooled. Inert, i.e. non-flammable gases such as carbon dioxide are often released in the case of decomposition, which also dilutes the oxygen in the direct environment of the coated substrate.

Suitable gas-separating constituents are hydroxides such as aluminum hydroxide and magnesium hydroxide and the hydrates thereof, which separate water, and carbonates such as calcium carbonate, which separate carbon dioxide. Basic carbonates can separate both water and $CO_2$. A combination of constituents starting the gas separation at different temperatures is preferable. Thus in the case of aluminum hydroxide the water separation starts at approx. 200° C., whereas the water separation in the case of magnesium hydroxide starts at approx. 350° C. such that the gas separation takes place over a larger temperature range.

Suitable ablative materials are, in the case of the influence of heat, water-releasing inorganic hydroxides or hydrates such as sodium, potassium, lithium, barium, calcium, magnesium, boron, aluminum, zinc, nickel, also boric acid and the partly dehydrated derivatives thereof.

The following compounds can be mentioned by way of example: $LiNO_3.3H_2O$, $Na_2CO_3H_2O$, $Na_2CO_3.7H_2O$, $Na_2CO_3.10H_2O$, $Na_2Ca(CO_3)_2.2H_2O$, $Na_2Ca(CO_3)_2.5H_2O$, $Na(HCO_3)Na_2CO_3.2H_2O$, $Na_2S_2O_3.5H_2O$, $Na_2O_3Si.5H_2O$, $KF.2H_2O$, $CaBr_2.2H_2O$, $CaBr_2.6H_2O$, $CaSO_4.2H_2O$, $Ca(SO_4).{_{1/2}}H_2O$, $Ba(OH)_2.8H_2O$, $Ni(NO_3)_2.6H_2O$, $Ni(NO_3)_2.4H_2O$, $Ni(NO_3)_2.2H_2O$, $Zn(NO_3)_2.4H_2O$, $Zn(NO_3)_2.6H_2O$, $(ZnO)_2(B_2O_3)_2.3H_2O$, $Mg(NO_3)_2\ 6H_2O$, $MgSO_4.7H_2O$, $Mg(OH)_2$, $Al(OH)_3$, $Al(OH)_3.3H_2O$, $AlOOH$, $Al_2[SO_4]_3.nH_2O$ with n=14-18, optionally in the mixture with $AlNH_4(SO_4)_2.12H_2O$, $KAl(SO_4)_2.\ 12\ H_2O$, $CaOAl_2O_3.10H_2O$, $MgCO_3.3H_2O$, $Ca_2Mg_{14}(Al_1Fe)_4CO_3(OH)_{42}.29H_2O$, $Ca_3Si(OH)_6(SO_4)(CO_3).12H_2O$, $Mg_2(OH)_2CO_3.H_2O$, $3CaOAl_2O_3.3CaSO_4.32H_2O$, $Mg_5(OH)_2(CO_3)_4.4H_2O$, $Ca_4Al_2(OH)_{14}.6H_2O$, $Mg_6Al_2(OH)_{16}CO_3.4H_2O$, $CaAl_2(OH)_4(CO_3)_2.3H_2O$, $Al_{14}(CO_3)_3(OH)_{36}$, $3CaO\ Al_2O_3.6H_2O$, $NaAl(OH)CO_3$, water-containing zeolites, vermiculites, colemanite, perlites, mica, alkaline silicates, borax, modified carbons and graphites, silicic acids.

In a preferred embodiment, the hydrated salts are selected from the group consisting of $Al_2(SO_4).16-18H_2O$, $NH_4Fe(SO_4)_2\ 12H_2O$, $Na_2B_4O_7.\ 10H_2O$, $NaAl(SO_4)_2\ 12H_2O$, $AlNH_4(SO_4)_2\ 12-24H_2O$, $Na_2SO_4.10H_2O$, $MgSO_4.7H_2O$, $(NH_4)_2SO_4.12H_2O$; $KAl(SO_4)_2\ 12H_2O$, $Na_2SiO_3.9H_2O$, $Mg(NO_2)_26H_2O$, $Na_2CO_3.7H_2O$ and mixtures thereof.

Particularly preferred are aluminum dioxide, aluminum hydroxide hydrates, magnesium hydroxide and zinc borate since they have an activation temperature below 180° C.

One or more reactive flame retardants can be optionally added to the composition according to the invention. Compounds of this type are incorporated into the binder. An example in the context of the invention are reactive organophosphorus compounds such as 9,10-dihydro-9-oxa-10-phosphaphenanthrene-10-oxide (DOPO) and the derivatives thereof, such as for example DOPO-HQ, DOPO-NQ and adducts. Such compounds are for example described in S. V. Levchik, E. D. Weil, *Polym. Int.* 2004, 53, 1901-1929.

The ablative fire protection additive can be contained in a quantity of 5 to 99 wt % in the composition, and the quantity substantially depends on the form of application of the composition (spraying, painting and the like). In order to effect the best insulation possible, the proportion of the constituent C in the total formulation is set to be as high as possible. The proportion of the constituent C in the total formulation is preferably 5 to 85 wt % and particularly preferably 40 to 80 wt %.

The composition can contain, in addition to the intumescent additives, optionally conventional excipients, such as solvents for example xylene or toluene, wetting agents for example on the basis of polyacrylates and/or polyphosphates, defoamers for example silicon defoamers, thickeners for example alginate thickeners, colorants, fungicides, softeners for example chlorinated waxes, binders, flame retardants or various fillers for example vermiculite, inorganic fibers, quartz sand, micro glass beads, mica, silicon dioxide, mineral wool and the like.

Additional additives such as thickeners, rheological additives and fillers can be added to the composition. As rheological additives for example anti-setting agents, anti-sag agents and thixotropic agents, the following are preferably used, polyhydroxy carbonic acid amides, urea derivatives, salts of unsaturated carbonic acid esters, alkyl ammonium salts of acidic phosphoric acid derivatives, ketoximes, amine salts of p-toluene sulfonic acid, amine salts of sulfonic acid derivatives, as well as aqueous or organic solutions or mixtures of the compounds. Rheology additives on the basis of pyrogenic or precipitated silicic acids or on the basis of silanized pyrogenic or precipitated silicic acids can also be used. The rheology additive is preferably pyrogenic silicic acids, modified and unmodified layer silicates, precipitated silicic acids, cellulose ethers, polysaccharides, PU and acrylate thickeners, urea derivatives, castor oil derivatives, polyamides, and fatty acid amides and polyolefins, if present in solid form, pulverized celluloses and/or suspension agents, such as, for example, xanthan gum.

The composition according to the invention can be made as a two-component system or multicomponent system.

If the constituent A and the constituent B do not react with each other at room temperature without using a catalyst, they can be stored together. If a reaction occurs at room temperature, the constituent A and the constituent B must be arranged separated in a reaction-inhibiting manner. In the presence of a catalyst, said catalyst must be stored either separated from the constituents A and B, or the constituent, which contains the catalyst, must be stored separated from the other constituent. This ensures that the hardening reaction is triggered only directly prior to the application. This makes the system easier to use. It is thus conceivable to store the two constituents A and B in one component and the catalyst in the other component, provided both constituents A and B do not react with each other without the addition of a catalyst.

In a preferred embodiment of the invention, the composition according to the invention is made as a two-component system, and the constituent A and the constituent B are arranged separated in a reaction-inhibiting manner. Accordingly, a first component, which is component I, contains the constituent A and a second component, which is component II, contains the constituent B. This ensures that the two constituents A and B of the binder are mixed together only directly prior to the application and trigger the hardening reaction. This makes the system easier to use.

The at least one epoxide resin is preferably contained in the component I in this regard in a quantity of 15 to 95 wt %.

If a reactive diluent is used, then it is contained in the component I in a quantity of 90 to 2 wt %, preferably 70 to 3 wt %, further preferably 50 to 4 wt % and more preferably 40 to 5 wt %.

The thio compound, in particular thiol-functionalized compound is preferably contained in the component II in a quantity of 0.5 to 90 wt %, particularly preferably in a quantity of 2 to 85 wt %.

The constituent C can, in this regard, be contained as a total mixture or in individual constituents distributed in one component or a plurality of components. The distribution of the constituent C takes place depending on the compatibility of the compounds contained in the composition, such that neither a reaction between the compounds contained in the composition nor a reciprocal disruption can take place. This is dependent on the compounds used. This ensures that the highest possible proportion of fillers can be achieved. This leads to better cooling, even at low layer thicknesses of the composition.

The composition is applied as a paste with a paintbrush, a roller or by spraying onto the substrate, which can be metallic, plastic in the case of cable routes or soft fittings made of mineral wool. The composition is preferably applied by means of an airless spraying method.

The composition according to the invention, in comparison to the solvent and water-based systems, is characterized by a relatively rapid hardening by means of an addition reaction and thus physical drying is not required. This is, in particular very important if the coated constructional components have to be quickly loaded or further processed, whether it be by coating with a cover layer or moving or transporting the structural components. The coating is thus also notably less susceptible to external influences on the construction site, such as e.g. impact from (rain) water or dust or dirt which, in the case of solvent or water-based systems, may lead to a leaching out of water-soluble constituents, or, in the case of dust accumulation, to a reduced ablative effect. The composition remains simple to process in particular, using common spray methods because of the low viscosity of the composition despite the high solid content, which can be up to 99 wt % in the composition without the addition of slightly volatile solvent.

In this regard, the composition according to the invention is suitable, in particular as fire protection coating, in particular sprayable coating for structural components on a metallic and non-metallic basis. The composition according to the invention can be used in particular in the field of construction as a coating, in particular as fire protection coating for individual cables, cable bundles, cable routes and cable channels or other lines as well as fire protection coating for steel construction elements, but also for construction elements made from other materials such as concrete or wood.

A further subject matter of the invention is therefore the use of the composition according to the invention as a coating, in particular as a coating for construction elements or structural elements made from steel, concrete, wood and other materials, such as for example plastics, in particular as fire protection coating for individual cables, cable bundles, cable routes and cable channels or other lines or soft fittings.

The present invention also relates to objects, which are obtained when the composition according to the invention hardens. The objects have excellent ablative properties.

The following examples serve to further explain the invention.

EXEMPLARY EMBODIMENTS

The following listed constituents are used for the manufacture of ablative compositions according to the invention. The individual constituents are respectively mixed and homogenized by means of a dissolver. Free standing films have been manufactured by means of scrapers.

In order to determine the fire protection properties, the hardened composition was subjected to a test according to EN ISO 11925-2. The test is carried out in a draft-free Mitsubishi FR-D700SC electric inverter combustion chamber. In the test, a small burner flame is directed at an angle of 45° for 30 seconds on the sample surface which corresponds to surface ignition.

Samples with the dimensions 11 cm×29.5 cm and an application thickness of 1 mm are respectively used. These samples hardened at room temperature and were aged for three days at 40° C.

After aging for three days at 40° C., the test is carried out for ignitability and height of the attacked surface.

The hardening time and the hardening progress were determined. In this regard, it was tested with a spatula when the hardening of the coating started.

Example 1

Component A

| Constituents | Quantity [g] |
|---|---|
| Epilox F 16-01 [1] | 26.8 |
| Durcal 5 [2] | 28.9 |

[1] Low-molecular epoxide resin on bisphenol F basis (viscosity (25° C.) 1200-1600 mPas (DIN 53 015); epoxide equivalent 157-167 g/equivalent (DIN 16 945))
[2] Calcium carbonate, ground

15

Component B

| Constituents | Quantity [g] |
|---|---|
| Glycol di(3-mercaptopropionate) | 10.3 |
| Pentaerythritoltetra(3-mercaptopropionate) | 10.1 |
| Ancamine K54 [3] | 1.4 |
| Durcal 5 | 28.9 |

[3] Pentaerythritoltetra(3-mercaptopropionate)

Component C

| Constituent | Quantity [g] |
|---|---|
| Aluminum trihydrate [4] | 14.65 |

[4] Aluminium trihydrate (HN 434 from the J.M. Huber Corporation, Finland)

Example 2

Component A

| Constituents | Quantity [g] |
|---|---|
| Epilox F 16-01 | 26.8 |
| Durcal 5 | 37.93 |

Component B

| Constituents | Quantity [g] |
|---|---|
| Glycol di(3-mercaptopropionate) | 9.9 |
| Pentaerythritoltetra(3-mercaptopropionate) | 10.1 |
| 2,4,6-tris(dimethylaminomethyl)phenol | 1.4 |
| Durcal 5 | 12.6 |

Component C

| Constituents | Quantity [g] |
|---|---|
| Aluminum trihydrate [4] | 12.7 |
| Magnesium hydroxide | 8.8 |

Example 3

Component A

| Constituents | Quantity [g] |
|---|---|
| Epilox F 16-01 | 26.8 |
| Durcal 5 | 38.0 |

Component B

| Constituents | Quantity [g] |
|---|---|
| Glycol di(3-mercaptopropionate) | 9.8 |
| Pentaerythritoltetra(3-mercaptopropionate) | 10.0 |
| 2,4,6-tris(dimethylaminomethyl)phenol | 1.4 |
| Durcal 5 | 12.7 |

Component C

| Constituents | Quantity [g] |
|---|---|
| Aluminum trihydrate | 12.8 |
| Exolite AP 755 [5] | 8.8 |

[5] Ammonium polyphosphate

Comparative Example 1

A commercial fire protection product (Hilti CFP S-WB) based on aqueous dispersion technology (acrylate dispersion) served as the comparison.

TABLE 1

Results of the determination of the hardening time

|  | Comparative example 1 | Example 1 | Example 2 | Example 3 |
|---|---|---|---|---|
| Hardening time | 24 h | 21 min | 19 min | 18.5 min |

TABLE 2

Results of the test according to EN ISO 11925-2

| Example | Ignition | Reaching the 15 cm mark |
|---|---|---|
| Comparative example 1 | No | No |
| Example 1 | Yes | No |
| Example 2 | No | No |
| Example 3 | No | No |

The invention claimed is:

1. A fire protection composition comprising:
   (A) a first constituent comprising at least one multifunctional epoxide resin;
   (B) a second constituent comprising at least one thiol-functionalized compound as a hardener and at least one amine as a co-hardening agent,
   wherein the thiol-functionalized compound is selected from the group consisting of glycol-bis(2-mercaptoacetate), glycol-bis(3-mercaptopropionate), 1,2-propyleneglycol-bis(2-mercaptoacetate), 1,2-propyleneglycol-bis(3-mercaptopropionate), 1,3-propyleneglycol-bis(2-mercaptoacetate), 1,3-propyleneglycol-bis(3-mercaptopropionate), tris(hydroxymethyl)methane-tris(2-mercaptoacetate), tris(hydroxymethyl)methane-tris(3-mercaptopropionate), 1,1,1-tris(hydroxymethyl)ethane-tris(2-mercaptoacetate), 1,1,1-tris(hydroxymethyl)ethane-tris(3-mercaptopropionate), 1,1,1-trimethylolpropane-tris(2-mercaptoacetate), ethoxylated 1,1,1-trimethylolpropane-tris(2-mercaptoacetate), propoxylated 1,1,1-trimethylolpropane-tris(2-mercaptoacetate), 1,1,1-trimethylolpropane-tris(3-mercaptopropionate), ethoxylated 1,1,1- trimethylolpropane-tris(3-mercaptopropionate), propoxylated trimethylolpropane-tris(3-mercaptopropionate), 1,1,1-trimethylolpropane-tris(3-mercaptobutyrate), pentaerythritol-tris(2-mercaptoacetate), pentaerythritol-tetrakis(2-mercaptoacetate), pentaerythritol-tris(3-mercaptopropionate), pentaerythritol-tetrakis(3-mercaptopropionate), pentaerythritol-tris(3-mercaptobutyrate), pentaerythritol-tetrakis(3-mercaptopropionate), 2-ethylhexyl thioglycolate, isooctyl thioglycolate, di(n-butyl)thiodiglycolate, glycol-di-3-mercaptopropionate, 1,6-hexanedithiol, ethyleneglycol-bis(2-mercaptoacetate) and tetra(ethyleneglycol)dithiol, and wherein the at least one amine is selected form the group consisting of primary aliphatic amines, secondary aliphatic amines, polyamines, and combinations thereof;

(C) a third constituent comprising at least one ablative fire protection additive; and (D) a fourth constituent comprising a catalyst for the reaction of the epoxide resin with the thio compound, wherein the catalyst is a phenol derivative or a tertiary amine, wherein the ratio of all epoxide groups in the composition to the number of thiol groups in the composition is in the range of 0.2 to 5:1.

2. The intumescent composition according to claim 1, wherein the at least one thio compound is multifunctional.

3. The composition according to claim 1, wherein the at least one multi-functional epoxide resin can be obtained by means of the reaction of polyhydroxy compounds with epihalohydrins and the precursors thereof and has an epoxy equivalent weight (EEW)≤550 g/val.

4. The composition according to claim 3, wherein the polyhydroxy compound is selected from polyvalent phenols.

5. The composition according to claim 4, wherein the polyhydroxy compound is bisphenol A or bisphenol F or a mixture thereof.

6. The composition according to claim 1, wherein the at least one ablative fire protection additive is selected from the group consisting of $LiNO_3.3H_2O$, $Na_2CO_3.H_2O$, $Na_2CO_3.7H_2O$, $Na_2CO_3.10H_2O$, $Na_2Ca(CO_3)_2.2H_2O$, $Na_2Ca(CO_3)_2.5H_2O$, $Na(HCO_3)Na_2CO_3.2H_2O$, $Na_2S_2O_3.5H_2O$, $Na_2O_3Si.5H_2O$, $KF.2H_2O$, $CaBr_2.2H_2O$, $CaBr_2.6H_2O$, $CaSO_4.2H_2O$, $Ca(SO_4).\frac{1}{2}H_2O$, $Ba(OH)_2.8H_2O$, $Ni(NO_3)_2.6H_2O$, $Ni(NO_3)_2.4H_2O$, $Ni(NO_3)_2.2H_2O$, $Zn(NO_3)_2.4H_2O$, $Zn(NO_3)_2.6H_2O$, $(ZnO)_2(B_2O_3)_2.3H_2O$, $Mg(NO_3)_2.6H_2O$, $MgSO_4.7H_2O$, $Mg(OH)_2$, $Al(OH)_3$, $Al(OH)_3-3H_2O$, $AlOOH$, $Al_2[SO_4]_3.nH_2O$ with n=14-18, $KAl(SO_4)_2.12H_2O$, $CaOAl_2O_3.10H_2O$, $MgCO_3.3H_2O$, $Ca_2Mg_{14}(Al_1Fe)_4CO_3(OH)_{42}.29H_2O$, $Ca_3Si(OH)_6(SO_4)(CO_3).12H_2O$, $Mg_2(OH)_2CO_3.H_2O$, $3CaOAl_2O_3.3CaSO_4.32H_2O$, $Mg_5(OH)_2(CO_3)_4.4H_2O$, $Ca_4Al_2(OH)_{14}.6H_2O$, $Mg_6Al_2(OH)_{16}CO_3.4H_2O$, $CaAl_2(OH)_4(CO_3)_2.3H_2O$, $Al_{14}(CO_3)_3(OH)_{36}$, $3CaO\cdot Al_2O_3.6H_2O$, $NaAl(OH)CO_3$, water-containing zeolites, vermiculites, colemanite, perlites, mica, alkaline silicates, borax, modified carbons and graphites, silicic acids and mixtures thereof.

7. The composition according to claim 1, wherein the composition also contains organic and/or inorganic aggregates and/or further additives.

8. The composition according to claim 1, which is made as a two-component or multicomponent system.

9. A method of making a fire protection coating, comprising applying the composition according to claim 1 to a construction element or a structural element.

10. The method according to claim 9, wherein the construction or structure element is made from steel, concrete, wood, or plastic.

11. The method according to claim 9, wherein the construction element or structural element is non-metallic.

12. The method according to claim 9, wherein the construction element or structural element is selected from the group consisting of individual cables, cable bundles, cable routes, cable channels or other lines; and soft fittings.

13. Hardened objects obtained by hardening the composition according to claim 1.

14. The composition according to claim 6, wherein the at least one ablative fire protection additive is $Al_2(SO_4)_3.nH_2O$ with n=14-18 and further comprising $AlNH_4(SO_4)_2.12H_2O$.

15. The composition according to claim 1, wherein the composition is intumescent.

* * * * *